UNITED STATES PATENT OFFICE.

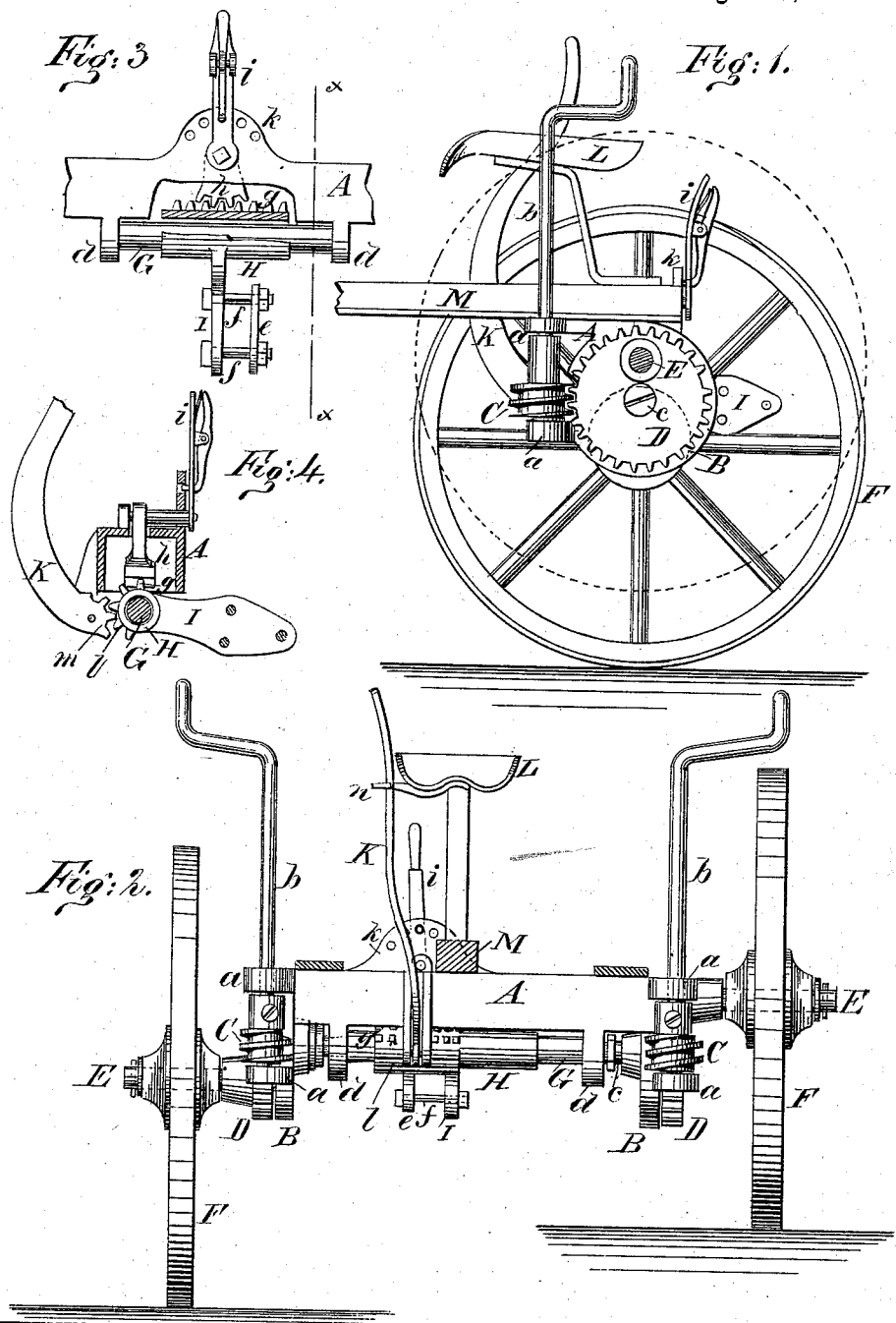

SAMUEL PENNOCK, OF ITHACA, NEW YORK.

IMPROVEMENT IN PLOW-SULKIES.

Specification forming part of Letters Patent No. 194,167, dated August 14, 1877; application filed June 18, 1877.

*To all whom it may concern:*

Be it known that I, SAMUEL PENNOCK, of Ithaca, in the county of Tompkins and State of New York, have invented a new and Improved Plow-Sulky, of which the following is a specification:

Figure 1 is a side elevation, in section, of my improved plow-sulky. Fig. 2 is a front elevation. Figs. 3 and 4 are detail views of the plow-adjusting mechanism.

Similar letters of reference indicate corresponding parts.

The object of my invention is to provide a plow-sulky in which the wheels may be adjusted independently and easily, and in which the plow-beam may be moved laterally and vertically, as required.

In the drawing, A is a frame, having attached to each end a disk, B. Upon each disk there are ears $a$, in which the shaft $b$ of the worm C is journaled.

A worm-wheel, D, is secured to the disk B by a bolt, $c$, upon which it turns. The said worm-wheel is engaged by the worm C.

An axle, E, projects from the face of the worm-wheel, and is arranged eccentrically in relation to the axis of the said wheel. The worms, worm-wheels, and axles are alike on both sides of the sulky, and upon the axles E wheels F are placed.

A round bar, G, is supported under the frame A by ears $d$, and upon it is placed a sleeve, H, which is shorter than the bar G, and is capable of turning and sliding thereon. To this sleeve an arm, I, is secured, to which the plow-beam is clamped by means of the plate $e$ and the bolts $f$.

Upon the sleeve H a rack, $g$, is formed, in which the teeth extend partly around the sleeve. This rack is engaged by a toothed sector, $h$, which is pivoted to the frame A, and is provided with a lever, $i$, having a locking-lever, which engages holes in the semicircular ear $k$, formed on the frame A. By means of this toothed sector the sleeve H is moved longitudinally on the bar G.

Longitudinal cogs $l$ are formed on the sleeve H, which are engaged by a lever, K, which is provided with a toothed sector, $m$, and is pivoted between ears that project from the frame A.

A seat, L, is attached to the tongue M, and to it a catch, $n$, is secured for holding the lever K when it is raised up into a vertical position.

The plow-beam is clamped to the arm I by the bolts $f$ and plate $e$. The wheels F are adjusted to the proper height by rotating the worm-wheel D by means of the worm C. The center of gravity of the machine may also be moved, so that more or less of the weight of the plow, the frame A, and the driver may be thrown on the tongue.

The plow may be adjusted laterally by moving the lever $i$, and it may be raised out of the ground by means of the lever K, and when it is to be moved from place to place it may be supported by placing the lever K under the catch $n$.

Having thus described my invention, I claim as new and desire to secure by Letters Patent—

1. The combination, with round bar G, supported under frame A, of the turning and sliding sleeve H, provided with longitudinal cogs $l$ and teeth $g$, and having arm I, attached to the plow-beam, as and for the purpose described.

2. The combination, with the sleeve H, having rack and longitudinal cogs, of the pivoted sector $h$, having lever $i$, and the lever K, having toothed sector $m$, as and for the purpose specified.

SAMUEL PENNOCK.

Witnesses:
CHS. G. DAY,
CHARLES J. PENNOCK.